June 16, 1931.        R. H. STONE        1,809,874
HOSE COUPLING
Filed Jan. 12, 1925
FIG. I.
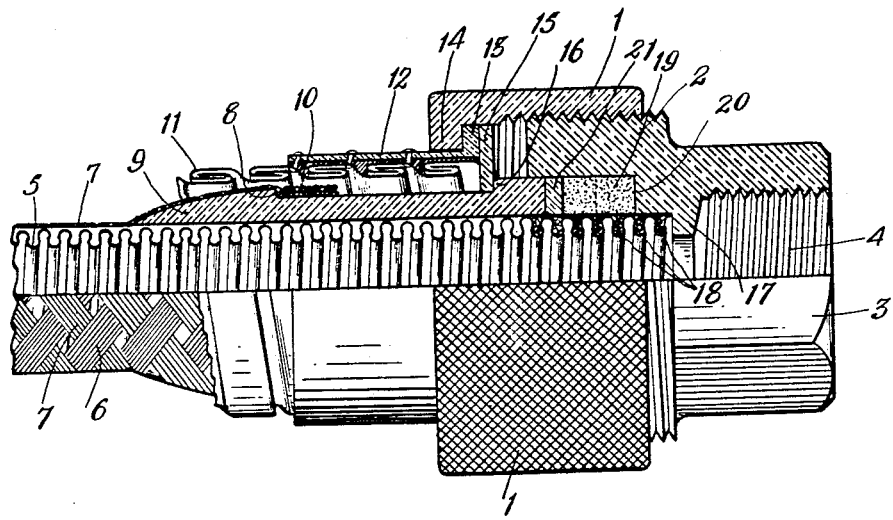
FIG. II.
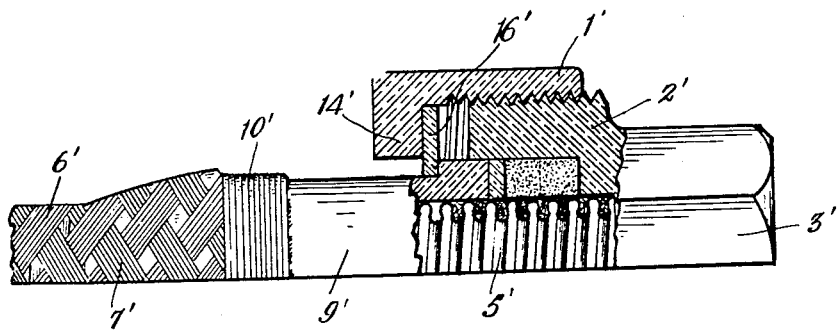
R. Harry Stone INVENTOR.
BY
Thomas Howe ATTORNEY.

106-82

Patented June 16, 1931

1,809,874

UNITED STATES PATENT OFFICE

R. HARRY STONE, OF IRVINGTON, NEW JERSEY, ASSIGNOR TO TITEFLEX METAL HOSE CO., A CORPORATION OF NEW JERSEY

HOSE COUPLING

Application filed January 12, 1925. Serial No. 1,735.

This invention relates to coupling for hose consisting in whole or in part of corrugated tube.

The main object of the invention is to provide couplings for hose of the character as indicated which shall be capable of withstanding high temperatures as for instance those which are incident to steam piping and in other applications.

On account of the peculiar character of corrugated metal hose it has hitherto proved generally necessary, in order to make a fluid tight joint against high pressure, as in steam piping, to solder the hose to the coupling. As is well known, however, solder is destructible by heat so that this method of connection is not always satisfactory.

According to the present invention, it is proposed to fill in the space between the corrugations for a suitable distance by a substance which will produce a substantially cylindrical surface of the outer circumference of the corrugated tube, this surface providing a suitable bearing for packing so as to produce a tight joint. The other appurtenant parts of the hose may also be secured without the use of means vulnerable to heat.

While the invention is of use as set forth it may have other applications than that referred to.

Other and ancillary objects of the invention will appear hereinafter.

In the accompanying drawings which illustrate the invention—

Fig. 1 is a view partly in longitudinal section and partly in side elevation of a coupling and the end of a hose embodying the invention; and Fig. 2 is a side elevation of the upper half of a coupling and hose end, partly broken away to show a longitudinal section, of a modification.

Referring to the drawings and first to Fig. 1, the apparatus comprises a coupling including a body 1 into which is screw-threaded a gland member 2 having a faced head 3, to facilitate the application of a wrench, and internally screw-threaded at 4 to receive the screw-threaded end of a pipe. The hose comprises a flexible corrugated metal tube 5 which may be formed of a helically disposed metal strip having a longitudinal groove and having the edges of adjacent convolutions interfolded, such tube being shown in the patent to L. H. Brinkman No. 1,198,392, patented September 12, 1916, but the tube may be of a different construction. About this tube is placed a braided metal covering comprising strands as 6 and 7 helically wound about the corrugated tube but in opposite directions and each of the strands consists of a number of parallel laid metal wires. The ends of these strands are secured to the coupling by passing them over a shoulder 8 upon a sleeve 9 and then binding them down tightly against that sleeve by means of a metal wire 10 wrapped and secured tightly about them. The snubbing of the strands over the shoulder 8 thus effected holds them securely in position with relation to the coupling.

It will be seen that this braid serves to prevent twisting of the hose in either direction which is a very important consideration as the corrugated tube formed from a flexible strip as described is peculiarly vulnerable to such twisting action.

Outside the braid referred to is a flexible armor 11 which is a tube formed from a helically disposed flexible strip having the edges of adjacent convolutions interfolded and wherein the flexibility is provided by clearances in the joint, the parts of the joint moving with relation to each other to permit flexure of the tube. This outer armor tube 11 which may be made of a strong and rugged construction so as to act as an armor to prevent injury of the enclosed structure by contact with external objects and also to add strength against tensile strains along the tube, is riveted to the sleeve 12 having a shoulder or flange 13 coming against the flange 14 on the body 1 and so preventing withdrawal of the sleeve 12 from that body. The sleeve 9 is secured in the coupling by means of a metal washer 15 which bears against the flange 13 and against which bears the shoulder 16 on the sleeve 9. In order to permit the placing of the washer 15 in position about the sleeve 9, and removing it therefrom, it is split or formed in two semi-circular halves.

The corrugated tube 5 bears against the shoulder 17 on the gland member 2 and has the space between corrugations for a short distance from its end substantially filled with a compound 18. This gives the tube a substantially plain cylindrical surface against which bears the packing 19 within the gland member and between the shoulder 20 and the annular washer 21 which comes against the end of the sleeve 9. This packing 19 may be any suitable packing, for instance, in steam piping any well known or suitable high pressure steam packing, and it will be seen that as the gland member is screwed into the body of the coupling, the packing will be compressed and forced against the substantially cylindrical surface formed upon the corrugated tube so that a fluid tight packed joint will be secured and without the necessity of solder or other heat vulnerable substances.

The washer 21 affords a suitable bearing surface for the packing whereby the packing will not stick or become bound to the stationary part of the coupling against which it is forced as might be the case if this ring were not present. The packing may adhere to the ring but this in turn may be turned upon the coupling part with which it engages so that turning of the parts in adjusting the coupling will not be interfered with by the binding of the packing thereagainst.

The compound 18 for filling the space between the corrugations is such as will be solid at the temperatures to which it may be subjected in practice but which may be fluid or plastic because of moisture or other characteristics, the compound becoming solid upon drying or other change in condition. It is applied to the tube in fluid or plastic condition and subsequently solidifies as indicated. A composition which has been found useful for this purpose is as follows:

Litharge 1 part by volume. Sodium silicate 2 parts by volume. A small quantity of castor oil, say 1%, will greatly improve by avoiding danger of cracking or hardening etc.

The litharge makes a good binder while the sodium silicate is strongly adherent to the metal.

Another good composition consists of equal parts of shredded asbestos and red lead, enough sodium silicate being added to make the mass suitably plastic.

While the compounds referred to have given satisfactory results, other suitable compounds may be employed.

Referring now to Fig. 2, the device is substantially as shown in Fig. 1 except that the outer armor tube 11 is omitted. Under these circumstances, the sleeve 12 is omitted, the split washer 16' bearing directly against the shoulder 14' on the body 1' and the hose and other parts of the device being constructed as described in connection with Fig. 1.

While one end of the hose is shown in each of the figures as secured to a coupling, it will be understood that both ends of the hose may be secured to couplings in the same manner.

While the invention has been illustrated in what are considered its best applications it may have other embodiments without departing from its spirit and is not limited to the structures shown in the drawings.

What I claim is:

1. The combination with a corrugated tube having a section solid for substantially the depth of the corrugations, of a coupling within which said tube enters and packing bearing upon the said section.

2. The combination with a coupling, of a corrugated tube entered therein having spaces between its corrugations and within the coupling substantially filled with a suitable material, means for securing said tube to said coupling and a body of packing in said coupling separate from said material and bearing against the substantially cylindrical portion of said tube formed by the filling of space between its corrugations.

3. The combination with a coupling, of a corrugated tube entered therein having spaces between its corrugations and within the coupling substantially filled with a suitable material, means for securing said tube to said coupling and packing in said coupling bearing against the substantially cylindrical portion of said tube formed by the filling of space between its corrugations, said coupling comprising means for forcing said packing against said tube.

4. The combination with a coupling, of a corrugated tube entered therein having spaces between its corrugations and within the coupling substantially filled with a suitable material, and packing in said coupling bearing against the substantially cylindrical portion of said tube formed by the filling of space between its corrugations, said coupling comprising means for forcing said packing against said tube, and helically disposed strands surrounding said tube and secured to said coupling.

5. The combination with a coupling, of a corrugated tube entered therein having spaces between its corrugations and within the coupling substantially filled with a suitable material, packing in said coupling bearing against the substantially cylindrical portion of said tube formed by the filling of space between its corrugations, said coupling comprising means for forcing said packing against said tube and a flexible armor tube about said corrugated tube and secured to said coupling.

6. The combination with a coupling, of a corrugated tube entered therein having space between the corrugations and within the coupling substantially filled with a suitable material, packing in said coupling bearing against the substantially cylindrical portion of said tube formed by the filling of space between its corrugations, said coupling comprising means for forcing said packing against said tube, helically disposed strands surrounding said tube and secured to said coupling, and flexible armor tube about said corrugated tube and strands and secured to said coupling.

7. The combination with a fluid tight corrugated tube, of material substantially filling the space between the corrugations, said material including sodium silicate and possessing the property of being plastic and solidifying upon standing.

8. The combination with a corrugated tube, of material substantially filling the space between the corrugations, said material including litharge and sodium silicate and having the property of being plastic and solidifying upon standing.

9. The combination with a corrugated tube, of material substantially filling the space between the corrugations, said material including sodium silicate, litharge and oil and possessing the property of being plastic and solidifying upon standing.

In testimony whereof I have signed this specification this 6th day of January, 1925.

R. HARRY STONE.